(12) United States Patent
Aoyagi et al.

(10) Patent No.: US 10,931,844 B2
(45) Date of Patent: Feb. 23, 2021

(54) IMAGE INSPECTION APPARATUS AND IMAGE FORMING APPARATUS

(71) Applicants: Kohta Aoyagi, Kanagawa (JP);
Susumu Mikajiri, Tokyo (JP);
Kimiharu Yamazaki, Kanagawa (JP);
Satoshi Nakayama, Kanagawa (JP);
Hideyo Makino, Tokyo (JP); Yoshinari Onuma, Kanagawa (JP)

(72) Inventors: Kohta Aoyagi, Kanagawa (JP);
Susumu Mikajiri, Tokyo (JP);
Kimiharu Yamazaki, Kanagawa (JP);
Satoshi Nakayama, Kanagawa (JP);
Hideyo Makino, Tokyo (JP); Yoshinari Onuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/814,254

(22) Filed: Mar. 10, 2020

(65) Prior Publication Data
US 2020/0296243 A1 Sep. 17, 2020

(30) Foreign Application Priority Data
Mar. 11, 2019 (JP) .............................. JP2019-044186

(51) Int. Cl.
*H04N 1/00* (2006.01)
*G06T 7/13* (2017.01)
*H04N 1/32* (2006.01)

(52) U.S. Cl.
CPC .......... *H04N 1/00748* (2013.01); *G06T 7/13* (2017.01); *H04N 1/00795* (2013.01);
(Continued)

(58) Field of Classification Search
CPC ........... G06T 2207/10008; G06T 7/13; H04N 1/00748; H04N 1/00795; H04N 1/32448;
(Continued)

(56) References Cited

U.S. PATENT DOCUMENTS 9,848,098 B2    12/2017    Mita
10,207,495 B2    2/2019    Aoyagi et al.
(Continued)

FOREIGN PATENT DOCUMENTS

JP    2016-139026    8/2016
JP    2016-180857    10/2016
(Continued)

*Primary Examiner* — Negussie Worku
(74) *Attorney, Agent, or Firm* — Ipusa, PLLC

(57) ABSTRACT

An image inspection apparatus includes a first outputter that outputs color information of an image to be formed on a recording medium determined according to the type of recording medium; a reader provided facing one side of the recording medium and configured to output an image signal obtained by reading the recording medium; a second outputter that outputs an edge position of the recording medium and/or the image formed on the recording medium detected based on the image signal; first background members configured to face and contact another side of the recording medium and having different heights; second background members configured to face and contact the another side of the recording medium and having different colors; and an arranger that brings one member, selected according to the recording medium type from among the first and second background members, into contact with the another side of the recording medium.

10 Claims, 9 Drawing Sheets

(52) U.S. Cl.
CPC ............... *H04N 1/32448* (2013.01); *G06T 2207/10008* (2013.01); *H04N 2201/0081* (2013.01)

(58) Field of Classification Search
CPC ....... H04N 2201/0081; H04N 1/00013; H04N 1/00068; H04N 1/00082; H04N 1/0009; H04N 1/0057; H04N 1/00652; H04N 1/00761; H04N 1/00793; H04N 1/00801; H04N 2201/0082; G03G 15/5062; G03G 15/6529; G03G 2215/00949; B65H 2513/10; B65H 2513/102; B65H 2513/106; B65H 7/20
USPC ........................................................ 358/488
See application file for complete search history.

(56) References Cited

U.S. PATENT DOCUMENTS

| | | | | |
|---|---|---|---|---|
| 10,855,865 | B2* | 12/2020 | Yamazaki | H04N 1/00702 |
| 2006/0216047 | A1* | 9/2006 | Yamamoto | G03G 15/04018 |
| | | | | 399/45 |
| 2007/0264066 | A1* | 11/2007 | Peng | G03G 15/6567 |
| | | | | 399/395 |
| 2012/0194597 | A1* | 8/2012 | Okamoto | B41J 11/663 |
| | | | | 347/16 |
| 2014/0168710 | A1* | 6/2014 | Ikari | H04N 1/52 |
| | | | | 358/2.1 |
| 2016/0337529 | A1* | 11/2016 | Kubota | H04N 1/0057 |
| 2018/0020108 | A1* | 1/2018 | Nakayama | H04N 1/1235 |
| 2018/0139339 | A1* | 5/2018 | Xu | G03G 15/5062 |
| 2019/0132478 | A1* | 5/2019 | Mizutani | H04N 1/4052 |
| 2019/0163112 | A1* | 5/2019 | Nikaku | G06T 7/73 |
| 2019/0166271 | A1* | 5/2019 | Yamazaki | H04N 1/00236 |
| 2019/0202648 | A1* | 7/2019 | Nakayama | B65H 7/14 |
| 2019/0278210 | A1* | 9/2019 | Sekita | G03G 15/5062 |
| 2020/0301326 | A1* | 9/2020 | Yamazaki | G03G 15/6573 |

FOREIGN PATENT DOCUMENTS

| | | |
|---|---|---|
| JP | 2018-001715 | 1/2018 |
| JP | 2018-083405 | 5/2018 |
| JP | 2019-102939 | 6/2019 |

* cited by examiner

IMAGE INSPECTION APPARATUS AND IMAGE FORMING APPARATUS

CROSS-REFERENCE TO RELATED APPLICATION

The present application is based on and claims priority under 35 U.S.C. § 119 to Japanese Patent Application No. 2019-044186, filed on Mar. 11, 2019, the contents of which are incorporated herein by reference in their entirety.

BACKGROUND OF THE INVENTION

1. Field of the Invention

The present invention relates to an image inspection apparatus and an image forming apparatus.

2. Description of the Related Art

With respect to an image forming apparatus, there is a known technique of detecting, with a reading device, an outer shape (an edge position) of a recording medium and an edge position of an image formed on the recording medium, and correcting an image forming condition (an edge position, the magnification, the distortion, etc., of an image) according to the detection result, so that an image can be appropriately formed with respect to the edge position of the recording medium.

Further, there is a technique of using an image of a reference mark, which is formed on a recording medium to have a high color contrast with respect to the color of the recording medium that differs depending on the type of recording medium, to accurately detect an edge position of the image of the reference mark with a reading device and appropriately adjust an image forming range (see, for example, Patent Document 1).

Patent Document 1: Japanese Unexamined Patent Application Publication No. 2016-139026

SUMMARY OF THE INVENTION

According to one aspect of the present invention, there is provided an image inspection apparatus including an image color information outputter configured to output color information of an image to be formed on a recording medium, the color information being determined according to a type of the recording medium; a reader provided facing one side of the recording medium and configured to output an image signal obtained by reading the recording medium; a position outputter configured to output at least one of an edge position of the recording medium and an edge position of the image formed on the recording medium that are detected based on the image signal input from the reader; a plurality of height setting background members configured to face and contact another side of the recording medium and having different heights in a direction intersecting a surface of the recording medium; a plurality of color setting background members configured to face and contact the another side of the recording medium and having different colors; and a background member arranger configured to bring one member, which is selected according to the type of the recording medium from among the plurality of height setting background members and the plurality of color setting background members, into contact with the another side of the recording medium.

BRIEF DESCRIPTION OF THE DRAWINGS

FIGS. 6A to 6D are diagrams illustrating an example of two-dimensional image data acquired by a position outputting unit (part 2), wherein FIGS. 6A and 6C are diagrams illustrating two-dimensional image data according to a comparative example, and FIGS. 6B and 6D are diagrams illustrating two-dimensional image data according to the first embodiment of the present invention;

DETAILED DESCRIPTION OF THE PREFERRED EMBODIMENTS

Figure 1:
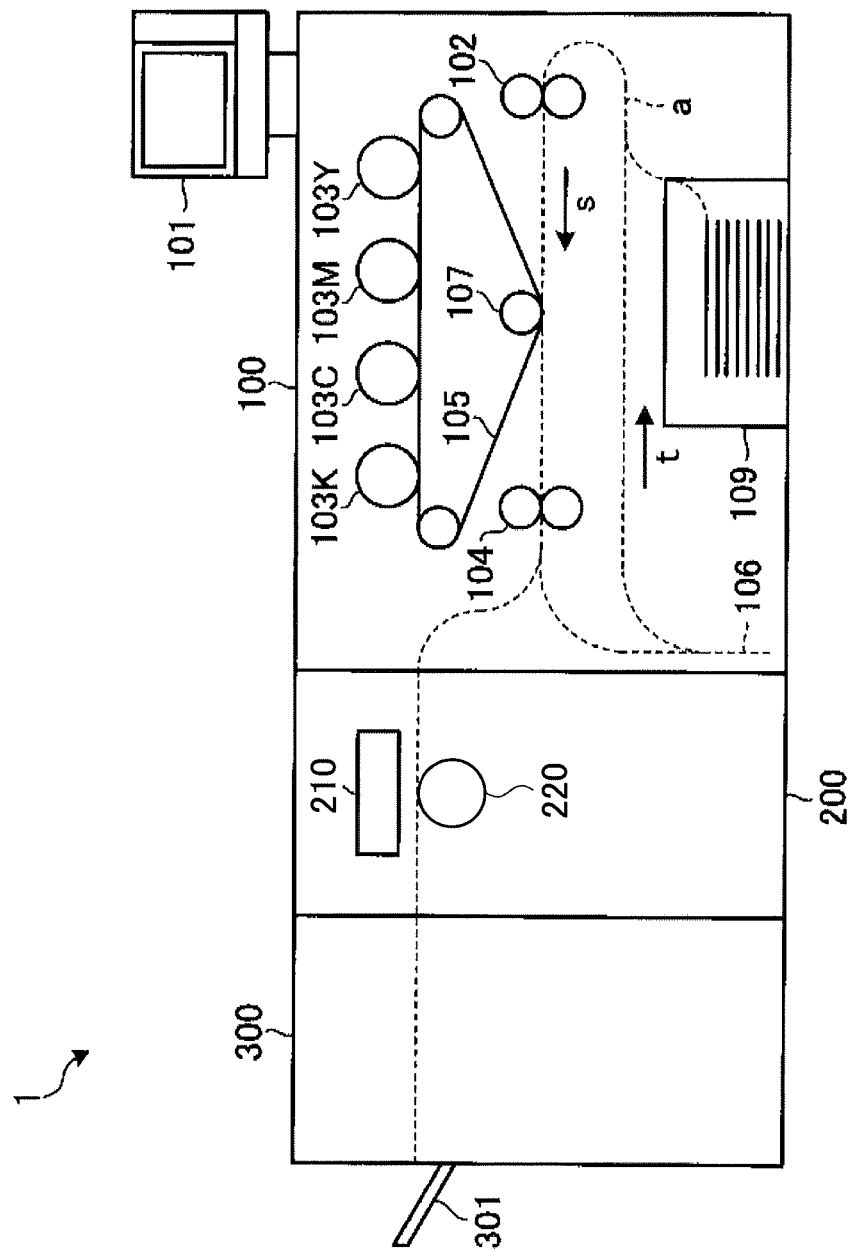
FIG. 1 is a diagram illustrating an example of a configuration of a printing system according to a first embodiment of the present invention.

In the technique of Patent Document 1, due to a change in the distance from the reading device to the surface of the recording medium depending on the thickness of the recording medium that differs according to the type of recording medium, etc., the reading result may be out of focus or may include a magnification error, etc., and there have been cases where it is not possible to appropriately detect the edge position of the recording medium or the edge position of an image such as a reference mark formed on the recording medium.

A problem to be addressed by an embodiment of the present invention is to appropriately detect the edge position of a recording medium or the edge position of an image formed on the recording medium, regardless of the type of recording medium.

Hereinafter, an embodiment for carrying out the present invention will be described with reference to the drawings. In the drawings, the same elements are denoted by the same reference numerals and overlapping descriptions may be omitted.

In the following, an example will be described where an image inspection apparatus and an image forming apparatus are applied to a printing system such as a commercial printing machine (production printing machine) that continuously prints a large number of sheets in a short time.

First Embodiment

<Configuration of Printing System According to First Embodiment>

FIG. 1 is a diagram illustrating an example of the configuration of a printing system 1 according to the first embodiment. As illustrated in FIG. 1, the printing system 1 includes an image forming apparatus 100, an image inspection apparatus 200, and a stacker 300.

The image forming apparatus 100 includes an operation panel 101, image forming units (photoconductor drums) 103Y, 103M, 103C, and 103K of a tandem electrophotographic method, a transfer belt 105, a secondary transfer roller 107, a sheet feeding unit 109, a pair of conveying rollers 102, a fixing roller 104, and a reverse path 106.

The operation panel 101 is an operation display unit that performs various operation inputs to the image forming apparatus 100 or the image inspection apparatus 200 and displays various screens.

The image forming units 103Y, 103M, 103C, and 103K each form a toner image by performing an image forming process (a charging process, an exposure process, a development process, a transfer process, and a cleaning process), and transfers the formed toner image to the transfer belt 105. In the present embodiment, a yellow toner image is formed on the image forming unit 103Y, a magenta toner image is formed on the image forming unit 103M, a cyan toner image is formed on the image forming unit 103C, and a black toner image is formed on the image forming unit 103K. However, the present embodiment is not limited thereto, and the order of arranging the image forming units 103Y, 103M, 103C, and 103K may be changed as appropriate. Further, the image forming apparatus 100 may include an image forming unit that forms a toner image of a color other than yellow, magenta, cyan, or black. An example of a color other than yellow, magenta, cyan and black, is white and the like.

The transfer belt 105 conveys a full color toner image, which has been formed by transferring and superimposing images formed by the image forming units 103Y, 103M, 103C, and 103K, to a secondary transfer position of the secondary transfer roller 107. In the present embodiment, first, the yellow toner image is transferred (primary transfer) to the transfer belt 105, and then the magenta toner image, the cyan toner image, and the black toner image are sequentially transferred to and superimposed on the transfer belt 105. However, the present embodiment is not limited thereto, and the order in which the toner images of the respective colors are transferred to the transfer belt 105 may be changed as appropriate. Also, hereinafter, when the color is not particularly distinguished, each of the image forming units 103Y, 103M, 103C, and 103K is referred to as the image forming unit 103.

In the sheet feeding unit 109, a plurality of recording media are stacked and stored, and the sheet feeding unit 109 feeds the recording media. The recording medium may be a recording sheet (transfer sheet) or the like; however, the present embodiment is not limited thereto, and the recording medium may be coated paper, cardboard, an overhead projector (OHP) sheet, a plastic film, prepreg, copper foil, or the like, as long as an image can be formed (recorded) on the medium.

The pair of conveying rollers 102 conveys the recording medium fed from the sheet feeding unit 109 in the direction of an arrow s on a conveying path a.

The secondary transfer roller 107 collectively transfers (secondary transfer) the full color toner image conveyed by the transfer belt 105, to a recording medium conveyed by the pair of conveying rollers 102, at the secondary transfer position.

The fixing roller 104 fixes the full color toner image to a recording medium by heating and apply pressure to the recording medium on which the full color toner image has been transferred.

In the case of single-sided printing, the image forming apparatus 100 conveys a recording medium on which a full color toner image has been fixed, to the image inspection apparatus 200. On the other hand, in the case of double-sided printing, the image forming apparatus 100 conveys the recording medium on which the full color toner image has been fixed, to the reverse path 106.

The reverse path 106 reverses the front side and the back side of the recording medium by switching back the conveyed recording medium, and conveys the recording medium in the direction of an arrow t. The recording medium conveyed by the reverse path 106 is re-conveyed by the pair of conveying rollers 102, a full color toner image is transferred to the side opposite to the previous side by the secondary transfer roller 107, and the toner image is fixed onto the recording medium by the fixing roller 104. Thereafter, the recording medium is conveyed to the image inspection apparatus 200 and the stacker 300.

The image inspection apparatus 200, which is arranged downstream of the image forming apparatus 100, includes a reading device 210, a background unit 220, and the like, and detects at least one of an edge position of a recording medium conveyed from the image forming apparatus 100 and an edge position of an image formed on the recording medium. The recording medium for which detection has been completed, is ejected to the stacker 300. Note that details of the configuration of the image inspection apparatus 200 are described below with reference to FIG. 2.

The stacker 300 includes a tray 301. The stacker 300 stacks the recording medium ejected from the image inspection apparatus 200 in the tray 301.

<Configuration of Image Inspection Apparatus According to First Embodiment>

Figure 2:
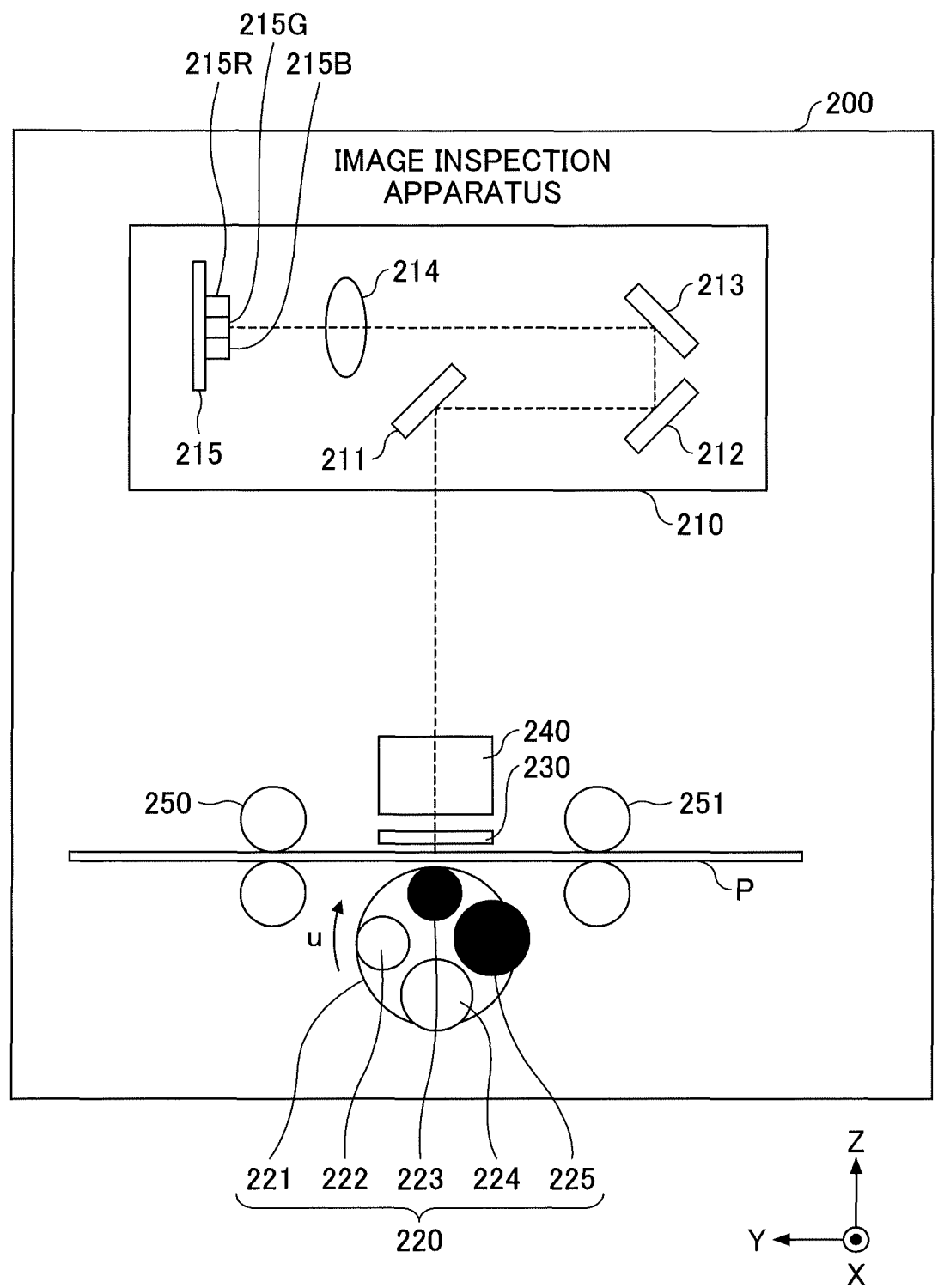
FIG. 2 is a diagram illustrating an example of a configuration of an image inspection apparatus according to the first embodiment of the present invention.

Next, the configuration of the image inspection apparatus according to the present embodiment will be described with reference to FIG. 2. FIG. 2 is a diagram illustrating an example of the configuration of the image inspection apparatus 200. As illustrated in FIG. 2, the image inspection apparatus 200 includes the reading device 210, the background unit 220, a contact glass 230, an illuminating unit 240, and pairs of conveying rollers 250 and 251.

The pairs of conveying rollers 250 and 251 convey a recording medium P conveyed from the image forming apparatus 100, in a Y direction in FIG. 2. One of the pairs of conveying rollers 250 and 251 may be a pair of driving rollers that are rotatably driven by a driving unit such as a motor, and the other one of the pairs of conveying rollers 250 and 251 may be a pair of driven rollers that are rotated according to the recording medium P being conveyed.

The contact glass 230 is made of transparent glass and contacts the recording medium P being conveyed. The contact glass 230 has a function of reducing the fluctuation and the like of the recording medium P during reading (at the time of imaging) by the reading device 210. As illustrated in FIG. 2, the recording medium P is conveyed in the Y direction between the contact glass 230 and the background unit 220.

The illuminating unit 240 is formed of a Light Emitting Diode (LED) array or the like in which a plurality of LEDs are arranged in an axial direction of the pair of conveying rollers 250 or the like (in an X direction in FIG. 2, hereinafter referred to as the width direction). The illuminating unit 240 illuminates the recording medium P that is being conveyed, by a line-shaped light.

However, the illuminating unit 240 is not limited to the above configuration; the illuminating unit 240 may simultaneously turn on the LEDs of the colors of red, green, and blue so that these colors are mixed to emit a light having a broad wavelength band close to white light. Further, the illuminating unit 240 may be configured to include a single element that emits light having a shape of a long line in the width direction, such as a fluorescent tube. A fluorescent tube can emit white light with uniform brightness in the width direction.

Further, a light guiding member, whose width direction is the longitudinal direction, may be used to turn on the white or the red, green, and blue LEDs arranged at both ends of the light guiding member, so that the light passes through the light guiding member, thereby emitting a line-shaped light. The light guiding member can emit light having uniform brightness in the width direction. Further, the illuminating unit 240 may have a configuration in which a light guide lens is provided for efficiently guiding light from the LED array to an area through which the edges in the width direction of the recording medium P being conveyed pass.

The reading device 210 is provided facing one side of the recording medium (the positive Z-direction side in FIG. 2), and is implemented by a contact image sensor (CIS) or the like. More specifically, the reading device 210 includes mirrors 211 to 213, a lens 214, and a pixel array 215. The light that is emitted from the illuminating unit 240 and then reflected from the recording medium P, is reflected by the mirrors 211 to 213, respectively, as illustrated by dashed lines in FIG. 2, and is focused on a light receiving surface of the pixel array 215 by the lens 214.

The pixel array 215 is an element in which Photo Diodes (PDs), which are photoelectric conversion elements that convert optical signals into electrical signals, are arranged in an array in a width direction. Each photoelectric conversion element corresponds to one pixel, and outputs an electrical signal according to the amount of light received. The pixel array 215 outputs electrical signals (image signals) corresponding to one line of pixels in the width direction. Further, at this time, the pixel array 215 receives, at every predetermined timing, the light reflected from the recording medium P being conveyed in the Y direction by the pairs of conveying rollers 250 and 251, and outputs image signals corresponding to one line. These lines of image signals output on a per-line basis, are connected to each other, in a direction perpendicular to the arrangement direction of pixels in the pixel array 215, to thereby acquire two-dimensional image data.

Further, the pixel array 215 includes a pixel array 215R for receiving red light, a pixel array 215G for receiving green light, and a pixel array 215B for receiving blue light, each of which being arranged such that the width direction and the pixel arrangement direction are substantially parallel.

The pixel array 215R, which receives red light, includes a red color filter in front of the light receiving surface, and receives red light that has passed through the color filter. The red color filter allows light in the red wavelength band to pass through, and absorbs or reflects light in the other wavelength bands. Similarly, the pixel array 215G includes a green color filter and receives light in the green wavelength band, and the pixel array 215B includes a blue color filter and receives light in the blue wavelength band.

Note that as the pixel array, a Charge Coupled Device (CCD), a Complementary Metal-Oxide-Semiconductor (CMOS), or the like, may be used. Further, the pixel array 215 may be formed by using an area sensor of a CCD or a CMOS having a two-dimensional pixel array. Further, in order to increase the light collection efficiency of the pixel array 215, a rod lens array or the like may be provided for guiding the light reflected by the recording medium P to the pixel array 215.

The reading device 210 receives the light reflected from the recording medium P that is the reading target and outputs image signals. Specifically, the reading device 210 can output image signals including an edge (an end) of the recording medium P conveyed from the image forming apparatus 100 and an image formed on the recording medium P.

The background unit 220 contacts the other side (the negative Z-direction side in FIG. 2) of the recording medium P and includes a background member that serves as the background of the recording medium P when reading the edge of the recording medium P by the reading device 210. Note that the "other side" is the side opposite to the side ("one side") of the recording medium P that the reading device 210 is arranged to face.

More specifically, the background unit 220 includes a revolver 221, a white color small diameter roller 222, a black color small diameter roller 223, a white color large diameter roller 224, and a black color large diameter roller 225. As illustrated in FIG. 2, the white color small diameter roller 222, the white color large diameter roller 224, the black color small diameter roller 223, and the black color large diameter roller 225 are mounted to the revolver 221 so as to be arranged around the columnar axis of a columnar member included in the revolver 221. Here, the white color small diameter roller 222, the white color large diameter roller 224, the black color small diameter roller 223, and the black color large diameter roller 225 are examples of background members, respectively, and are examples of cylindrical members.

In the columnar member included in the revolver 221, a plurality of circular through-holes that extend in the columnar axis direction, are formed. Further, the through-holes are formed so as to be arranged around the columnar axis of the revolver 221. By passing the rollers through these through-holes, the rollers can be mounted to the revolver 221.

Note that the through hole having a circular shape may not necessarily have a circular cross-sectional shape, and the cross-sectional shape may be a part of a circular shape. Further, when a prismatic member or the like is mounted instead of a roller, a rectangular through-hole may be formed.

Further, the revolver 221 is rotatable about the columnar axis thereof (in the direction of an arrow u in FIG. 2). As an example, a motor (not illustrated) attached to the revolver 221 is driven to rotate by control signals, so that the revolver 221 is rotated in the direction of the arrow u, and a predetermined roller among the plurality of rollers mounted in the revolver 221 can be brought into contact with the other side of the recording medium P. However, the present embodiment is not limited to rotating the revolver 221 in response to a control signal. An operator and the like of the printing system 1 may manually rotate the revolver 221 so that a predetermined roller among the plurality of mounted rollers is brought into contact with the other side of the recording medium P.

As described above, the white color small diameter roller 222, the white color large diameter roller 224, the black color small diameter roller 223, and the black color large diameter roller 225 are provided so as to be able to contact the other side of the recording medium P by the rotation of the revolver 221.

The white color diameter small roller 222 and the black color diameter small roller 223 have the same roller diameter, but have different roller colors. As an example, when the basic color of the recording medium P is white, by bringing the black color small diameter roller 223 into contact with the other side of the recording medium P, the color contrast between the recording medium P and the black color small diameter roller 223 as a background member is increased, so that it is easier to detect the edge position of the recording medium P. As described above, the white color small diameter roller 222 and the black color small diameter roller 223 have been taken as examples; however, the same applies to the white color large diameter roller 224 and the black color large diameter roller 225. Further, examples of a white color roller and a black color roller are taken above; however, the present embodiment is not limited thereto, and rollers of other colors may be used depending on the color of the recording medium P.

On the other hand, the black color small diameter roller 223 and the black color large diameter roller 225 have the same roller color, but the diameters of the rollers are different. Therefore, when the black color large diameter roller 225 contacts the other side of the recording medium P, the black color large diameter roller 225 presses the recording medium P in the positive Z-direction of FIG. 2, and in this case, the height in the direction that intersects the surface of the recording medium P (the Z-direction of FIG. 2) can be different from that in the case where the black color small diameter roller 223 contacts the other side of the recording medium P. That is, compared to the case where the black color small diameter roller 223 contacts the other side of the recording medium P, when the black color large diameter roller 225 contacts the other side of the recording medium P, the one side of the recording medium P can be brought closer to the reading device 210.

The thickness of the recording medium P may vary depending on the type of recording medium, and the distance (height) between the one side of the recording medium P and the reading device 210 differs between the case of a thin recording medium P and the case of a thick recording medium P. Due to this difference in height, the image read by the reading device 210 may be out of focus.

In particular, the reading device 210 is configured to be thin, and, therefore, the depth of field is shallow. Thus, due to a slight difference in height between the one side of the recording medium P and the reading device 210 caused by the difference in the thickness of the recording medium P, the read image easily becomes out of focus. When an image that is out of focus is used, it is difficult to accurately detect the edge position of the recording medium P and the edge position of an image formed on the recording medium P.

On the other hand, in the present embodiment, for example, in the case of a thin recording medium P, by bringing the black color large diameter roller 225 into contact with the other side of the recording medium P, the one side of the recording medium P can be brought closer to the reading device 210. Conversely, in the case of a thick recording medium P, by bringing the black color small diameter roller 223 into contact with the other side of the recording medium P, the one side of the recording medium P can be prevented from being brought close to the reading device 210.

In this manner, regardless of the thickness of the recording medium P, the height from the one side of the recording medium P to the reading device 210 can be maintained constant, and thus the read image can be prevented from being out of focus. As described above, the black color small diameter roller 223 and the black color large diameter roller 225 are taken as examples; however, the same applies to the white color small diameter roller 222 and the white color large diameter roller 224.

Note that in the above-described example, a roller is used as the background member and the diameter of the roller is changed to change the "height"; however, the present embodiment is not limited thereto. For example, a prism may be used as the background member, and by changing the height (thickness) dimension in the cross-sectional shape of the prism, the "height" can be changed.

<Hardware Configuration of Printing System According to First Embodiment>

Figure 3:
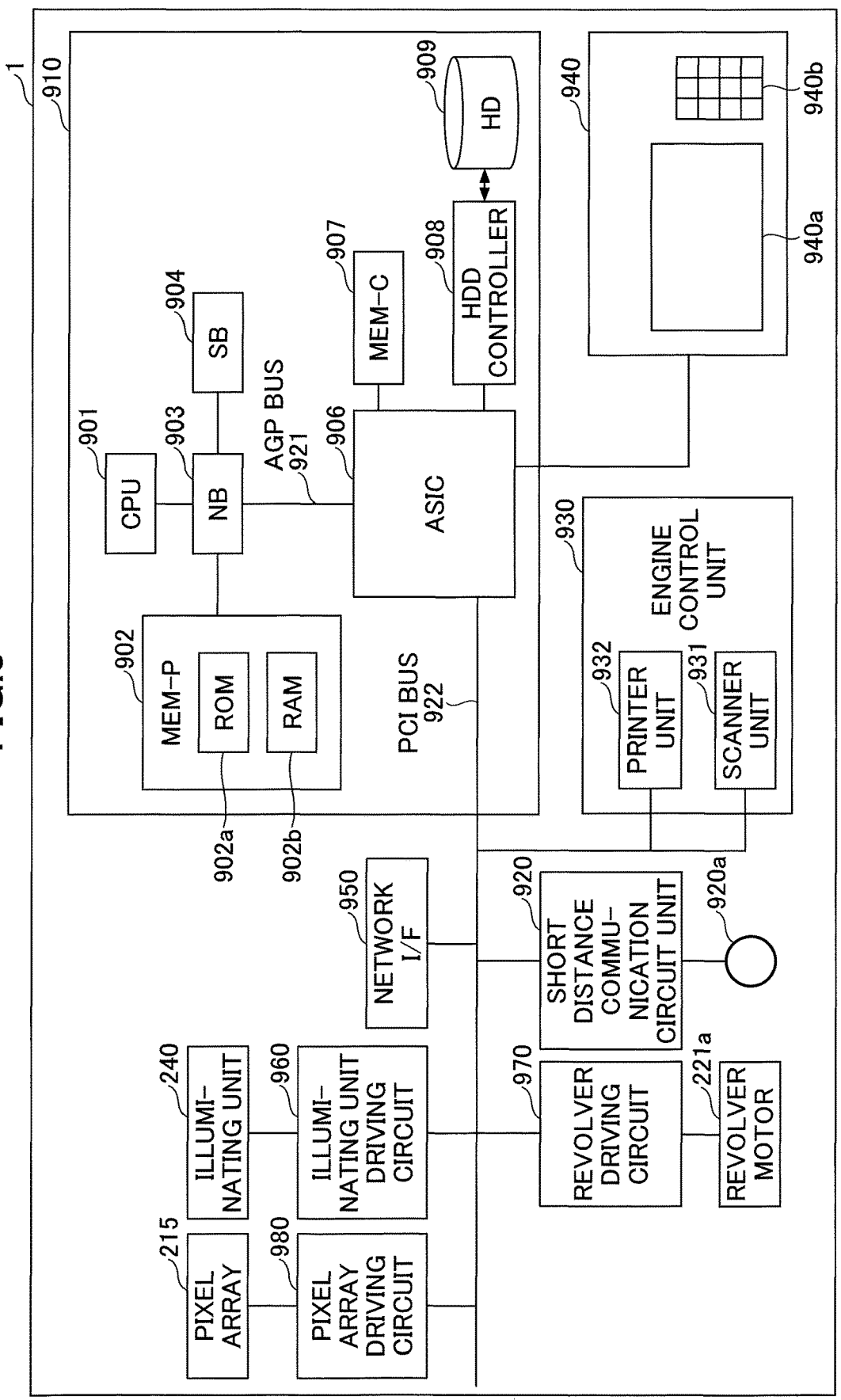
FIG. 3 is a block diagram illustrating an example of a hardware configuration of the printing system according to the first embodiment of the present invention.

Next, the hardware configuration of the printing system 1 will be described with reference to FIG. 3. FIG. 3 is a block diagram illustrating an example of the hardware configuration of the printing system 1 according to the present embodiment.

As illustrated in FIG. 3, the printing system 1 includes a controller 910, a short distance communication circuit unit 920, an engine control unit 930, an operation panel 940, and a network interface (I/F) 950.

Among these, the controller 910 includes a central processing unit (CPU) 901 as a main part of a computer, a system memory (MEM-P) 902, a North Bridge (NB) 903, a South Bridge (SB) 904, an Application Specific Integrated Circuit (ASIC) 906, a local memory (MEM-C) 907 as a storage unit, a hard disk drive (HDD) controller 908, and a hard disk (HD) 909 as a storage unit. Further, the NB 903 and the ASIC 906 are coupled by an Accelerated Graphics Port (AGP) bus 921.

Among these, the CPU 901 is a control unit that performs overall control of the printing system 1. The NB 903 is a bridge for coupling the CPU 901 to the MEM-P 902, the SB 904, and the AGP bus 921, and the NB 903 includes a memory controller for controlling reading and writing to the MEM-P 902, a Peripheral Component Interconnect (PCI) master, and an AGP target.

The MEM-P 902 includes a read-only memory (ROM) 902a, which is a memory for storing programs and data for implementing functions of the controller 910, and a random access memory (RAM) 902b, which is used for expanding programs and data and as a rendering memory at the time of memory printing.

Note that the program stored in the RAM 902b may be provided by being recorded in a computer-readable recording medium such as a Compact Disk Read-Only Memory (CD-ROM), a CD recordable (CD-R), a digital versatile disc (DVD) or the like, in a file of an installable format or an executable format.

The SB 904 is a bridge for coupling the NB 903 with PCI devices and peripheral devices. The ASIC 906 is an integrated circuit (IC) for image processing purposes including hardware elements for image processing, and serves as a bridge for coupling the AGP bus 921, the PCI bus 922, the HDD 908 and the MEM-C 907, respectively.

The ASIC 906 includes a PCI target and an AGP master, an arbitrator (ARB) that forms the core of the ASIC 906, a memory controller that controls the MEM-C 907, a plurality of Direct Memory Access Controllers (DMACs) that perform image data rotation and the like by hardware logic and the like, and a PCI unit that performs data transfer between a scanner unit 931 and a printer unit 932 via a PCI bus 922.

Note that the ASIC 906 may be coupled to an interface of a Universal Serial Bus (USB) or an interface of the Institute of Electronic and Electronic Engineers 1394 (IEEE 1394).

The MEM-C 907 is a local memory used as an image buffer and a code buffer for copying. The HD 909 is a storage device for storing image data, for storing font data used at the time of printing, and for storing forms. The HDD controller 908 controls the reading or writing of data to the HD 909 according to the control of the CPU 901.

The AGP bus 921 is a bus interface proposed for graphics accelerator cards to speed up graphics processing, and by directly accessing the MEM-P 902 with high throughput, the graphics accelerator card can be made faster.

Further, the short distance communication circuit unit 920 is provided with a short distance communication circuit 920a. The short distance communication circuit 920a is a communication circuit such as Near Field Communication (NFC), Bluetooth (registered trademark), etc.

The engine control unit 930 further includes the scanner unit 931 and the printer unit 932. The operation panel 940 includes a panel display unit 940a, such as a touch panel, which displays the current setting value or a selection screen and which accepts input from an operator, and an operation unit 940b, including a numeric pad for accepting setting values of image forming conditions such as a density setting condition, a start key for accepting a copy start instruction, and the like.

The controller 910 controls the entire printing system 1 and controls, for example, rendering, communication, input from the operation panel 940, and the like. The scanner unit 931 or the printer unit 932 includes an image processing portion such as error diffusion, gamma conversion, and the like.

Note that in the printing system 1, by using an application switching key of the operation panel 940, it is possible to sequentially switch and select the functions among a document box function, a copy function, a printer function, and a facsimile function.

When the document box function is selected, the document box mode is set, when the copy function is selected, the copy mode is set, when the printer function is selected, the printer mode is set, and when the facsimile function is selected, the facsimile mode is set.

The network I/F 950 is an interface for performing data communication using a network. The short distance communication circuit unit 920 and the network I/F 950 are electrically coupled to the ASIC 906 via the PCI bus 922.

Here, the printing system 1 further includes an illuminating unit driving circuit 960, a revolver driving circuit 970, and a pixel array driving circuit 980.

The illuminating unit driving circuit 960 is an electrical circuit that is electrically coupled to the illuminating unit 240 to drive the illuminating unit 240. The illuminating unit driving circuit 960 outputs a driving signal to the illuminating unit 240 in response to a control signal from the CPU 901 or the like, so that the intensity and timing of the light emitted by the illuminating unit 240 to the recording medium P are controlled.

The revolver driving circuit 970 is an electrical circuit that is electrically coupled to a revolver motor 221a attached to the revolver 221 and that drives the revolver motor 221a. The revolver driving circuit 970 outputs a driving signal to the revolver motor 221a in response to a control signal from the CPU 901 or the like, so that the revolver 221 is driven to rotate, and a predetermined roller among the white color small diameter roller 222, the white color large diameter roller 224, the black color small diameter roller 223, and the black color large diameter roller 225 is brought into contact with the other side of the recording medium P.

The pixel array driving circuit 980 is an electrical circuit that is electrically coupled to the pixel array 215 to drive the pixel array 215. The image signals according to the pixel array 215 may be input via the pixel array driving circuit 980 to execute a predetermined process or may be stored in the HD 909 or the like.

<Functional Configuration of Printing System According to First Embodiment>

Figure 4:
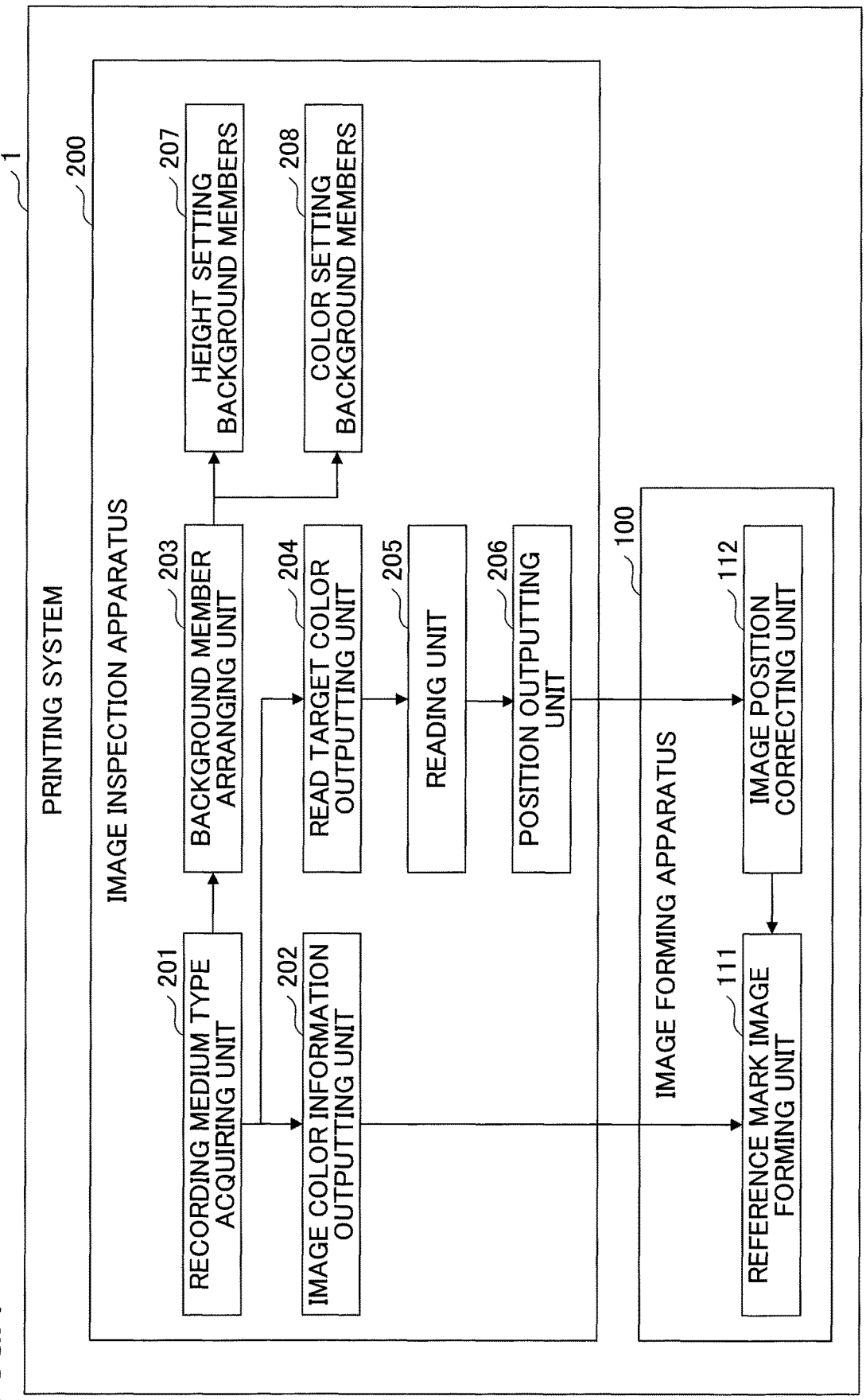
FIG. 4 is a block diagram illustrating an example of a functional configuration of an image forming apparatus according to the first embodiment of the present invention.

Next, the functional configuration of the printing system 1 will be described with reference to FIG. 4. As illustrated in FIG. 4, the image inspection apparatus 200 included in the printing system 1 includes a recording medium type acquiring unit 201, an image color information outputting unit 202, a background member arranging unit 203, a read target color outputting unit 204, a reading unit 205, and a position outputting unit 206. Among these, the recording medium type acquiring unit 201, the image color information outputting unit 202, the read target color outputting unit 204, and the position outputting unit 206 are implemented by executing a predetermined program by the CPU 901 of FIG. 3.

The recording medium type acquiring unit 201 acquires information of the type of the recording medium P on which an image is to be formed, and outputs the information to the image color information outputting unit 202, the background member arranging unit 203, and the read target color outputting unit 204, respectively. Here, the information of the type of the recording medium P includes color information of the recording medium P and thickness information of the recording medium P.

As an example, the recording medium type acquiring unit 201 can acquire the type information of the recording medium P including the color information and the thickness information, by referring to the HD 909 in which the brand information of the recording medium P and the color information and thickness information of the recording medium P are stored in association with each other, based on the brand of the recording medium P input by an operator of the printing system 1 using the panel display unit 940a.

Further, the recording medium type acquiring unit 201 may be implemented by a paper sheet brand identification reader as an example of a recording medium brand acquiring unit. A known technique can be applied to the paper sheet brand identification reader, and, therefore, detailed descriptions will be omitted here.

The image color information outputting unit 202 determines the color information of an image to be formed on the recording medium P, according to the type information of the recording medium P input from the recording medium type acquiring unit 201. Then, the image color information outputting unit 202 outputs the determined image color information to a reference mark image forming unit 111 included in the image forming apparatus 100.

The background member arranging unit 203 is implemented by the revolver 221 or the like of FIG. 2. The background member arranging unit 203 can bring one of a plurality of height setting background members 207 and a plurality of color setting background members 208, into contact with the other side of the recording medium P, according to the type information of the recording medium P input from the recording medium type acquiring unit 201.

Here, the plurality of height setting background members 207 are formed of a plurality of rollers or the like having different diameters. As an example, the plurality of height setting background members 207 are formed of a combination of the white color small diameter roller 222 and the white color large diameter roller 224 of FIG. 2, a combination of the black color small diameter roller 223 and the black color large diameter roller 225 of FIG. 2, or the like. Further, the plurality of color setting background members 208 are formed of a plurality of rollers or the like having different colors. As an example, the plurality of color setting background members 208 are formed of a combination of the white color small diameter roller 222 and the black color small diameter roller 223 of FIG. 2, a combination of the white color large diameter roller 224 and the black color large diameter roller 225, or the like.

The read target color outputting unit 204 determines the color to be the target of reading by the reading unit 205 ("read target color") in the recording medium P or in an image formed on the recording medium P, according to the type information of the recording medium P input from the recording medium type acquiring unit 201, and outputs the color information of the determined read target color to the reading unit 205.

The reading unit 205 is implemented by the reading device 210 (see FIG. 2) arranged facing the one side of the recording medium P. The reading unit 205 outputs, to the position outputting unit 206, an image signal obtained by reading the recording medium P according to the color of the color information input from the read target color outputting unit 204.

As an example, when the read target color outputting unit 204 outputs a red color as the color to be the target of reading by the reading unit 205, the reading unit 205 outputs an image signal read by using the pixel array 215R that receives red light. Further, as another example, when the read target color outputting unit 204 outputs a yellow color as the color to be the target of reading by the reading unit 205, the reading unit 205 outputs image signals read by using the pixel array 215R that receives red light and the pixel array 215G that receives green light.

The position outputting unit 206 detects at least one of the edge position of the recording medium P or the edge position of an image formed on the recording medium P, based on an image signal input from the reading unit 205. More specifically, the position outputting unit 206 acquires two-dimensional image data by connecting the lines of image signals in a direction perpendicular to the lines, the lines of image signals being read and output on a per-line basis by the reading unit 205 at every predetermined timing from the recording medium P being conveyed.

Then, the position outputting unit 206 executes predetermined image processing on the acquired two-dimensional image data, to detect at least one of the edge position of the recording medium P or the edge position of an image formed on the recording medium P. The position outputting unit 206 outputs the detection result to an image position correcting unit 112 included in the image forming apparatus 100.

Note that the functions of the image color information outputting unit 202, the background member arranging unit 203, the read target color outputting unit 204, and the position outputting unit 206 will be described in detail with reference to FIGS. 5A to 7D.

The image forming apparatus 100 included in the printing system 1 includes the reference mark image forming unit 111 and the image position correcting unit 112.

The reference mark image forming unit 111 is implemented by the image forming unit 103 or the like, and forms a reference mark image V on the recording medium P according to the color of the color information of the image to be formed on the recording medium P input from the image color information outputting unit 202 included in the image inspection apparatus 200. Here, the reference mark image V is an image of a mark formed on the recording medium P for detecting the edge position of an image formed on the recording medium P.

The image position correcting unit 112 is implemented by executing a predetermined program or the like by the CPU 901 illustrated in FIG. 3, and the image position correcting unit 112 corrects the edge position of the image to be formed on the recording medium P, based on at least one of the edge position of the recording medium P input from the position outputting unit 206 included in the image inspection apparatus 200 and the edge position of the image formed on the recording medium P. As the correction function by the image position correcting unit 112, a known technique can be applied, and, therefore, detailed descriptions thereof will be omitted.

Note that the image forming apparatus 100 and the image inspection apparatus 200 may have functions other than the functions described with reference to FIG. 4.

Further, although the CPU 901 has been described to implement part of the functions of the image forming apparatus 100 and the image inspection apparatus 200, these functions may be implemented by an electronic circuit such as an ASIC, a field programmable gate array (FPGA) and the like. Further, part of or all of the CPU 901 or the above-described electronic circuits may be mounted in the image forming apparatus 100 or mounted in the image inspection apparatus 200.

<Color Setting in Image Inspection Apparatus According to First Embodiment>

Next, the color setting in the image inspection apparatus 200 according to the first embodiment will be described with reference to FIGS. 5A to 7D.

Figure 5A:
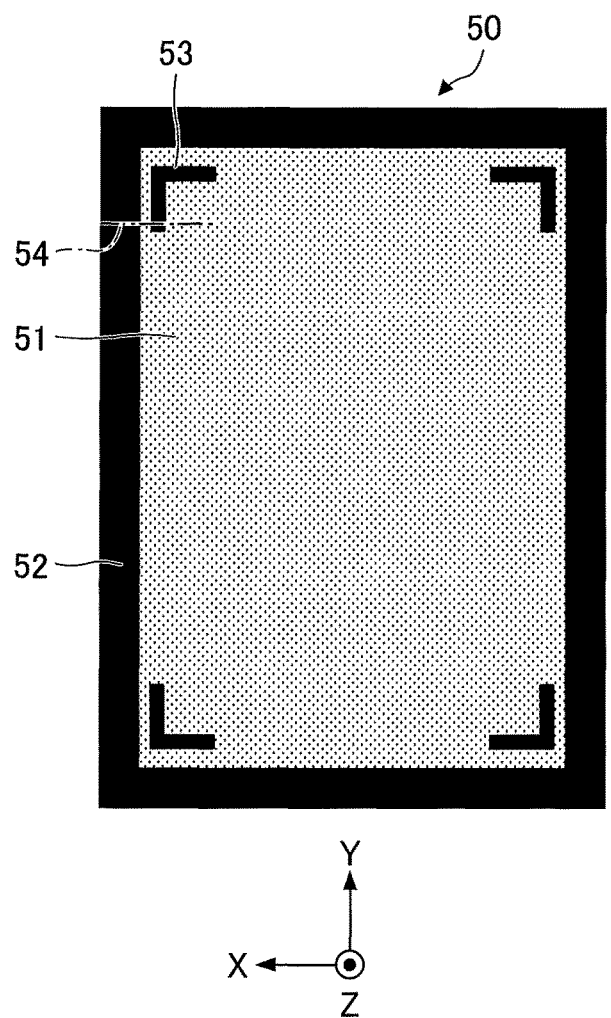
FIGS. 5A and 5B are diagrams illustrating an example of two-dimensional image data acquired by a position outputting unit (part 1) according to the first embodiment of the present invention.
Figure 5B:
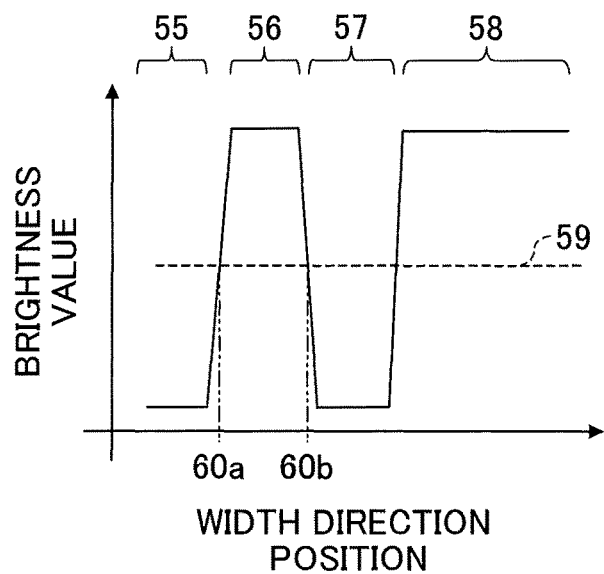

First, FIGS. 5A and 5B are diagrams (part 1) illustrating an example of the two-dimensional image data acquired by the position outputting unit 206, wherein FIG. 5A is a diagram illustrating the entire two-dimensional image data, and FIG. 5B is a diagram illustrating image data of a cross-section of a part in FIG. 5A.

FIG. 5A illustrates two-dimensional image data 50 acquired by the position outputting unit 206 based on image signals output by the reading unit 205. The two-dimensional image data 50 includes an area 51 (a white portion of FIG. 5A) obtained by reading the recording medium P and an area 52 (a black portion surrounding the white portion of FIG. 5A) obtained by reading a black background member. Further, the four corners of the area 51 obtained by reading the recording medium P include areas 53 obtained by reading reference mark images V formed on the recording medium P. In the example of FIG. 5A, an L-shaped reference mark is illustrated, but any mark, such as a cross-shaped mark may be used, as long as a position in two orthogonal directions in the XY plane can be detected.

FIG. 5B illustrates the image data of a cross-section 54 indicated by the dotted line in FIG. 5A. The horizontal axis of FIG. 5B indicates the position of the pixel in the width direction (X direction), and the vertical axis indicates the brightness value of the pixel.

A cross-sectional area 55 is the cross-sectional image data of the area 52 obtained by reading the black background member, in the cross-section 54. A cross-sectional area 56 is the cross-sectional image data of the area 51 obtained by reading the recording medium P, in the cross-section 54. A cross-sectional area 57 is the cross-sectional image data of the area 53 obtained by reading the reference mark image V, in the cross-section 54. A cross-sectional area 58 is the cross-sectional image data of the area 51 obtained by reading the recording medium P, in the cross-section 54.

Further, in FIG. 5B, a brightness threshold value 59 is a threshold value of the brightness value, for detecting the edge position of the recording medium P and the edge position of the image formed on the recording medium P. From the position of the pixel corresponding to a boundary position where the brightness value exceeds the threshold value, it is possible to detect the edge position of the recording medium P and the edge position of the image formed on the recording medium P. In the example of FIG. 5B, a position 60a indicates the edge position of the recording medium P and a position 60b indicates the edge position of the reference mark image V formed on the recording medium P. Such edge positions are detected by performing image processing on the two-dimensional image data 50. FIG. 5B illustrates an example of detecting the edge positions in the width direction (the X direction), but the edge position in the direction (the Y direction) perpendicular to the width direction can also be detected.

Here, in the example of FIGS. 5A and 5B, the color of the recording medium P is white. In this case, the background member arranging unit 203 selects, as the background member, the black color small diameter roller 223 or the black color large diameter roller 225 having high contrast with respect to the white color, and brings the selected background member into contact with the other side of the recording medium P. The white color has high brightness, and, therefore, by bringing a black color having low brightness in contact with the white color, the color of the background member can have high contrast with respect to the recording medium P.

Further, the image color information outputting unit 202 determines, as the color of the reference mark image V, black that has high contrast with respect to white, and outputs the determined color to the reference mark image forming unit 111. Accordingly, the reference mark image forming unit 111 forms a black reference mark image V on the recording medium P.

Accordingly, as illustrated in FIG. 5A, the area 52 obtained by reading the background member and the area 53 obtained by reading the reference mark image V become black, and the area 51 obtained by reading the recording medium P becomes white. The white area 51 has a high brightness value, and the black areas 52 and 53 have a low brightness value, and, therefore, the contrast between the white area and the black areas become high. Therefore, the boundary positions between the white area and the black areas become clear, so that the impact of image noise and the like can be reduced, and the edge position of the recording medium P and the edge position of the reference mark image V can be detected.

Figure 6A:
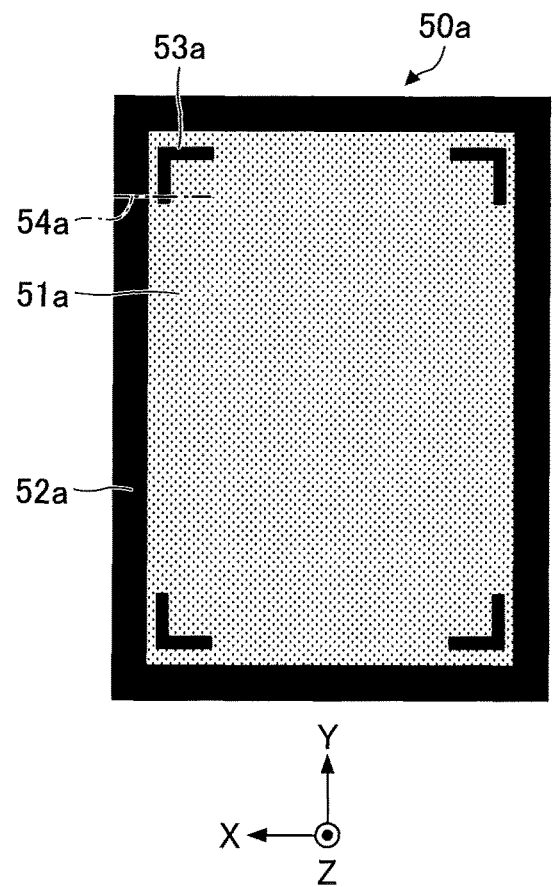
Figure 6B:
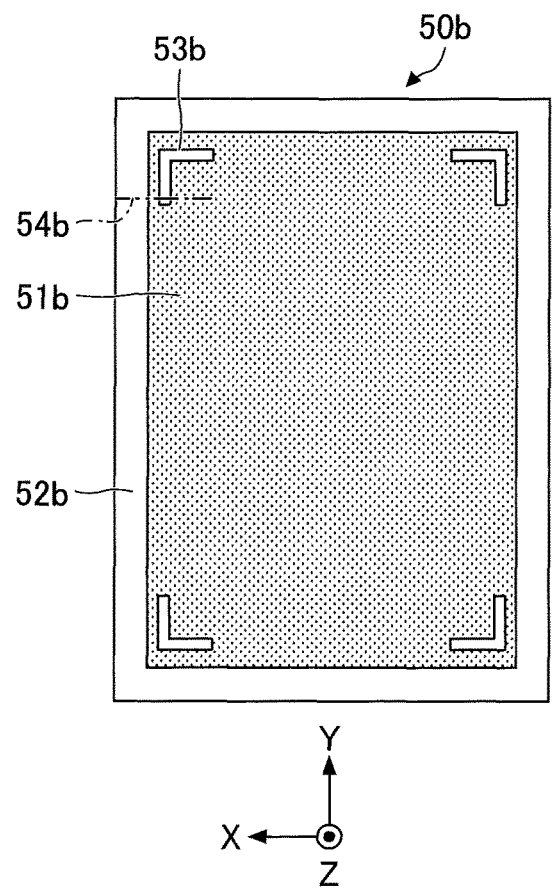
Figure 6C:
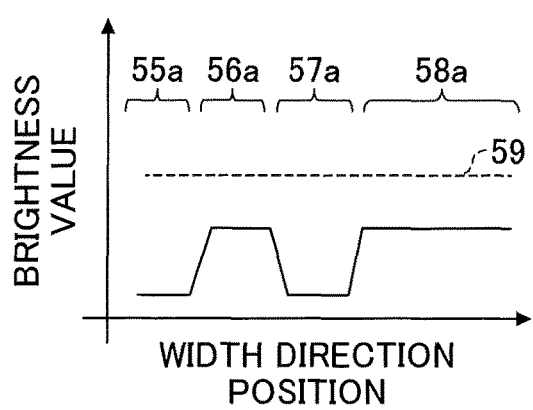
Figure 6D:
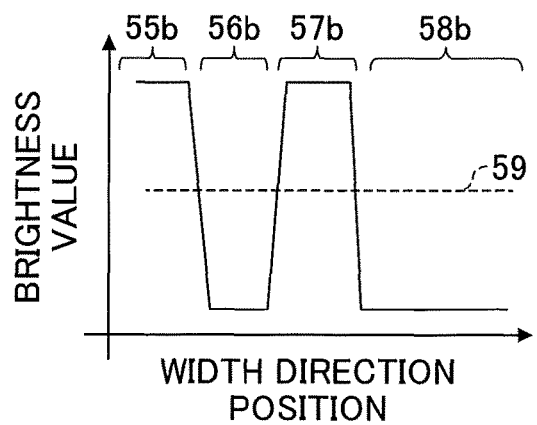

Next, FIGS. 6A to 6D are diagrams (part 2) illustrating an example of the two-dimensional image data acquired by the position outputting unit 206. FIG. 6A is a diagram illustrating the entire two-dimensional image data of a comparative example, and FIG. 6C is a diagram illustrating image data of a cross-section of a part in FIG. 6A. Further, FIG. 6B is a diagram illustrating the entire two-dimensional image data according to the present embodiment, and FIG. 6D is a diagram illustrating image data of a cross-section of a part in FIG. 6C.

FIG. 6A illustrates two-dimensional image data 50a acquired by the position outputting unit 206 based on image signals output by the reading unit 205. The two-dimensional image data 50a includes an area 51a obtained by reading the recording medium P and an area 52a obtained by reading a background member. The four corners of the area 51a obtained by reading the recording medium P include areas 53a obtained by reading reference mark images V formed on the recording medium P.

FIG. 6C illustrates the image data of a cross-section 54a indicated by a dotted line in FIG. 6A.

Similarly, FIG. 6B illustrates two-dimensional image data 50b acquired by the position outputting unit 206 based on the image signals output by the reading unit 205. The two-dimensional image data 50b includes an area 51b obtained by reading the recording medium P and an area 52b obtained by reading the background member. The four corners of the area 51b obtained by reading the recording medium P include areas 53b obtained by reading the reference mark images V formed on the recording medium P.

FIG. 6D illustrates the image data of a cross section 54b indicated by the dotted line in FIG. 6B. Note that the horizontal and vertical axes of FIG. 6C and FIG. 6D are to be viewed in the same manner as that of FIG. 5B, and, therefore, overlapping descriptions will be omitted.

In the comparative example of FIG. 6A and FIG. 6C, the color of the recording medium P is a gray color that is close to black. Accordingly, when the black color small diameter roller 223 and the black color large diameter roller 225 are selected as the background member, the brightness values of both areas 55a and 56a are low, and the contrast between these two areas is low, as illustrated in FIG. 6C. Also, there are no pixels exceeding the brightness threshold value 59, and, therefore, the edge position of the recording medium P cannot be detected. Similarly, when black is determined as the color of the reference mark image V, the brightness values of both areas 57a and 56a are low, and there are no pixels exceeding the brightness threshold value 59, and, therefore, the edge position of the reference mark image V cannot be detected.

It is possible to lower the brightness threshold value so that the area 56a exceeds the brightness threshold value; however, the difference in the brightness value between the area 56a and the areas 55a and 57a is small, and, therefore, the impact of image noise will be easily received, and it may not be possible to accurately detect the edge position.

Conversely, in the present embodiment illustrated in FIGS. 6B and 6D, the background member arranging unit 203 selects, as the background member, the white color small diameter roller 222 or the white color large diameter roller 224 having high contrast with respect to gray that is close to black, and brings the selected background member in contact with the other side of the recording medium P. Gray, which is close to black, has low brightness, and, therefore, if white having high brightness is selected, the contrast of the color of the background member with respect to the recording medium P can be increased.

Further, the image color information outputting unit 202 determines, as the color of the reference mark image V, a white color having high contrast with respect to the gray color close to black, and outputs the determined color to the reference mark image forming unit 111. Accordingly, the reference mark image forming unit 111 forms white reference mark images V on the recording medium P.

Accordingly, as illustrated in FIG. 6B, the area 52b obtained by reading the background member and the area 53b obtained by reading the reference mark image V become white, and the area 51b obtained by reading the recording medium P becomes gray, which is close to black. As illustrated in FIG. 6D, white areas 55b and 57b have high brightness values, and a gray area 56b, which is close to black, has a low brightness value, and the contrast between the white area and the gray area is high. The areas 55b and 57b exceed the brightness threshold value 59, and, therefore, it is possible to detect the edge position of the recording medium P and the edge position of the reference mark image V. Further, the boundary position between the areas 55b and 57b and the area 56b becomes clear, so that the impact of image noise and the like can be reduced, and the edge position of the recording medium P and the edge position of the reference mark image V can be detected.

Figure 7A:
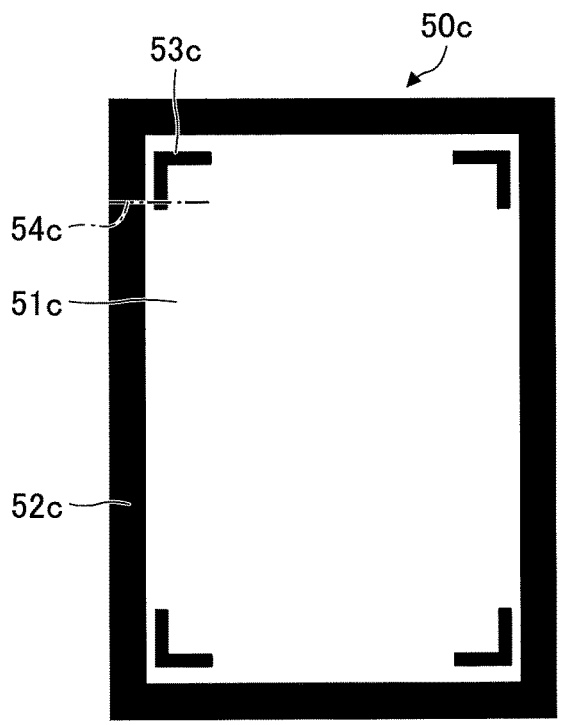
FIGS. 7A to 7D are diagrams illustrating an example of two-dimensional image data acquired by a position outputting unit (part 3) according to the first embodiment of the present invention.
Figure 7B:
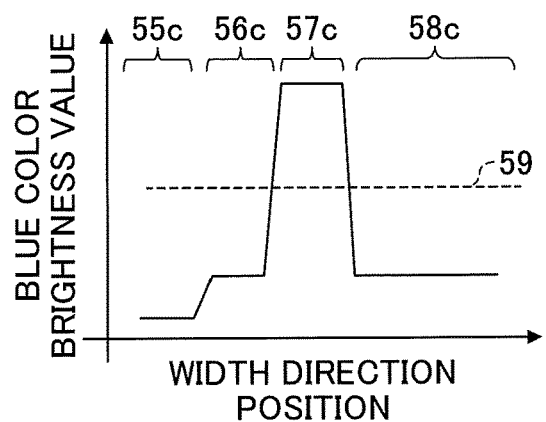
Figure 7C:
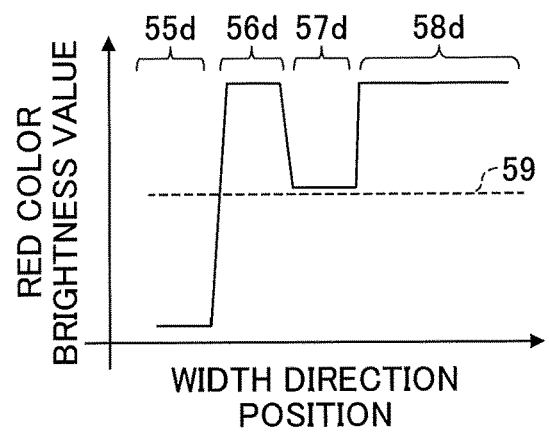
Figure 7D:
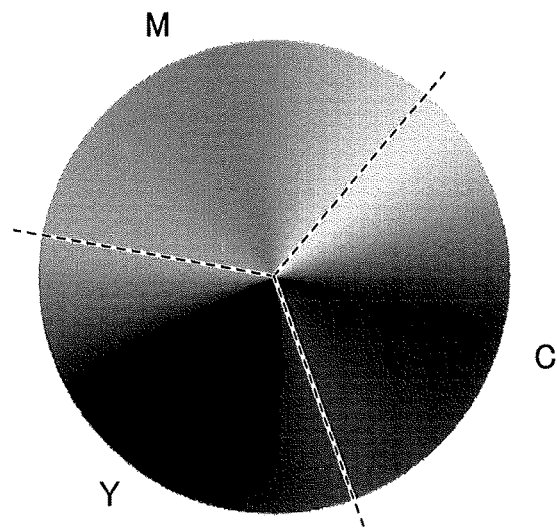

Next, as an example of the case where the color of the recording medium P is a chromatic color, a case where the color of the recording medium P is yellow will be described with reference to FIGS. 7A to 7D. FIGS. 7A to 7D are diagrams (part 3) illustrating an example of two-dimensional image data acquired by the position outputting unit 206, wherein FIG. 7A is a diagram illustrating the entire two-dimensional image data according to the present embodiment, FIG. 7B is a diagram illustrating blue image data of a cross-section of a part in FIG. 7A, FIG. 7C is a diagram illustrating red image data of a cross-section of a part in FIG. 7A, and FIG. 7D is a diagram illustrating a hue ring.

FIG. 7A illustrates two-dimensional image data 50c acquired by the position outputting unit 206 based on image signals output by the reading unit 205. The two-dimensional image data 50c includes an area 51c obtained by reading the recording medium P and an area 52c obtained by reading the background member. The four corners of the area 51c obtained by reading the recording medium P include areas 53c obtained by reading reference mark images V formed on the recording medium P.

FIG. 7B illustrates the blue image data in a cross section 54c indicated by a dotted line in FIG. 7A. The blue image data is image data based on the image signals output by the pixel array 215B.

FIG. 7C illustrates the red image data of the cross section 54c indicated by the dotted line in FIG. 7A. The red image data is image data based on the image signals output by the pixel array 215R.

The background member arranging unit 203 selects, as the background member, the black color small diameter roller 223 or the black color large diameter roller 225 having high contrast with respect to the yellow color of the recording medium P, and brings the selected background member into contact with the other side of the recording medium P. Yellow is a color having high brightness, and, therefore, if black having low brightness is selected, the contrast of the color of the background unit 220 with respect to the recording medium P can be increased.

Further, the image color information outputting unit 202 determines, as the color of the reference mark image V, cyan, which is a color on a side of a complementary color with respect to the yellow color of the recording medium P in the hue ring illustrated in FIG. 7D, and outputs the determined color to the reference mark image forming unit 111. Accordingly, the reference mark image forming unit 111 forms cyan reference mark images V on the recording medium P.

When the position outputting unit 206 detects the edge position of the reference mark image V formed on the recording medium P, the read target color outputting unit 204 determines the read target color (the color to be the target of reading) to be blue that is a color on a side of a similar color to the cyan color of the reference mark image V in the hue ring, and outputs the determination result to the reading unit 205. The reading unit 205 outputs image signals that are read by using the output of the pixel array 215B that receives blue light, according to the input color information.

Accordingly, as illustrated in FIG. 7B, an area 56c of the recording medium P has a low brightness value, and an area 57c of the reference mark image V has a high brightness value, so that there is a high contrast between these areas. The area 57c exceeds the brightness threshold value 59, and, therefore, the edge position of the reference mark image V can be detected. Further, the boundary position of the area 57c and the area 56c becomes clear, so that the impact of image noise and the like can be reduced, and the edge position of the reference mark image V can be detected.

On the other hand, when the position outputting unit 206 detects the edge position of the recording medium P, the read target color outputting unit 204 determines the read target color to be a color on a side of a similar color to or a color on a side of a complementary color to the yellow color of the recording medium P in the hue ring, and outputs the determination result to the reading unit 205. In the example of FIGS. 7A to 7D, the read target color outputting unit 204 determines the read target color to be red that is a color on a side of a similar color to the yellow color of the recording medium P. The reading unit 205 outputs image signals read by using the output of the pixel array 215R that receives red light, according to the determination result.

Accordingly, as illustrated in FIG. 7C, an area 55d of the background unit 220 has a low brightness value, and an area 56d of the recording medium P has a high brightness value, so that there is a high contrast between these two areas. The area 56d exceeds the brightness threshold value 59, and, therefore, the edge position of the recording medium P can be detected. Further, the boundary position between the area 55d and the area 56d becomes clear, so that the impact of image noise and the like can be reduced, and the edge position of the recording medium P can be detected.

<Operation of Printing System According to First Embodiment>

Figure 8:
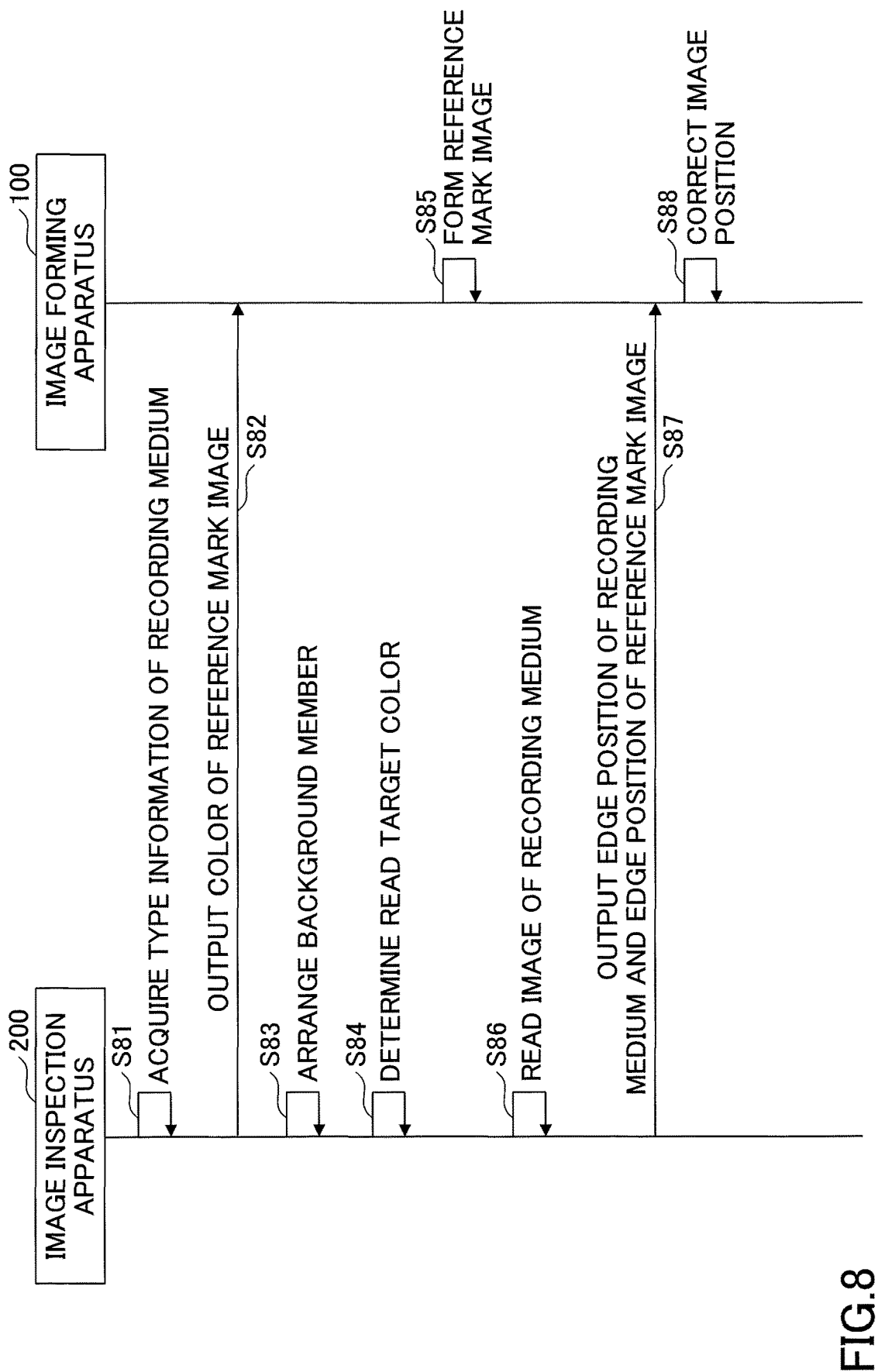
FIG. 8 is a sequence diagram illustrating an example of an operation by the printing system according to the first embodiment of the present invention.

Next, the operation of the printing system 1 according to the present embodiment will be described with reference to FIG. 8. FIG. 8 is a sequence diagram illustrating an example of an operation of the printing system 1.

First, in step S81, the recording medium type acquiring unit 201 of the image inspection apparatus 200 acquires information of the type of the recording medium P on which an image is to be formed, and outputs the information to each of the image color information outputting unit 202, the background member arranging unit 203, and the read target color outputting unit 204.

Subsequently, in step S82, the image color information outputting unit 202 determines the color information of the image to be formed on the recording medium P according to the type information of the recording medium P input from the recording medium type acquiring unit 201, and outputs the determined image color information to the reference mark image forming unit 111 included in the image forming apparatus 100.

Subsequently, in step S83, the background member arranging unit 203 brings, into contact with the other side of the recording medium P, one of the plurality of height setting background members 207 and the plurality of color setting background members 208, according to the type information of the recording medium P input from the recording medium type acquiring unit 201.

Subsequently, in step S84, the read target color outputting unit 204 determines a color to be the reading target by the reading unit 205, in the recording medium P or an image formed on the recording medium P, according to the type information of the recording medium P input from the recording medium type acquiring unit 201, and outputs the determined color information to the reading unit 205.

Note that the order of the operations of steps S82 to S84 can be changed as appropriate. Further, the operations of the steps S82 to S84 may be performed in parallel.

Subsequently, in step S85, the reference mark image forming unit 111 of the image forming apparatus 100 forms reference mark images V on the recording medium P according to the color information of an image to be formed on the recording medium P input from the image color information outputting unit 202 included in the image inspection apparatus 200.

Subsequently, in step S86, the reading unit 205 of the image inspection apparatus 200 outputs the image signals obtained by reading the recording medium P based on the color of the color information input from the read target color outputting unit 204, to the position outputting unit 206.

Subsequently, in step S87, the position outputting unit 206 executes predetermined image processing on the two-dimensional image data acquired based on the image signals input from the reading unit 205, to acquire at least one of the edge position of the recording medium P and the edge position of the image formed on the recording medium P. The position outputting unit 206 outputs the acquisition result to the image position correcting unit 112 included in the image forming apparatus 100.

Subsequently, in step S88, the image position correcting unit 112 of the image forming apparatus 100 corrects the edge position of an image to be formed on the recording medium P, based on at least one of the edge position of the recording medium P and the edge position of the image formed on the recording medium P input from the position outputting unit 206 included in the image inspection apparatus 200.

Accordingly, the printing system 1 can detect the edge position of the recording medium P and the edge position of the image formed on the recording medium, and correct the image forming position on the recording medium P according to the detection result.

<Effect According to First Embodiment>

As described above, in the present embodiment, the color information of the image to be formed on the recording medium P is determined according to the type information of the recording medium P, and the reference mark image V is formed on the recording medium P with the determined color. Further, the background member arranging unit 203 brings one of the plurality of height setting background members 207 and the plurality of color setting background members 208 into contact with the other side of the recording medium P, according to the type information of the recording medium P. Further, the reading unit 205 reads the recording medium P by the color of the color information input from the read target color outputting unit 204, and the position outputting unit 206 acquires at least one of an edge position of the recording medium P and an edge position of an image formed on the recording medium P, based on image signals from the reading unit 205.

Accordingly, a high contrast read image can be acquired regardless of the color of the recording medium P, and a position can be detected with high accuracy. Further, a read image in which out of focus is prevented, can be acquired regardless of the thickness of the recording medium P, and a position can be detected with high accuracy. As described above, the edge position of the recording medium P and the edge position of an image formed on the recording medium can be appropriately detected regardless of the type of the recording medium P.

Second Embodiment

Next, a printing system 1a according to a second embodiment will be described. Descriptions of the same elements as those of the first embodiment described above will be omitted.

In the first embodiment, an example in which the reading device 210 is implemented by a CIS or the like has been described. However, in the present embodiment, a reading device 210a includes an optical reduction system instead of a CIS.

Figure 9:
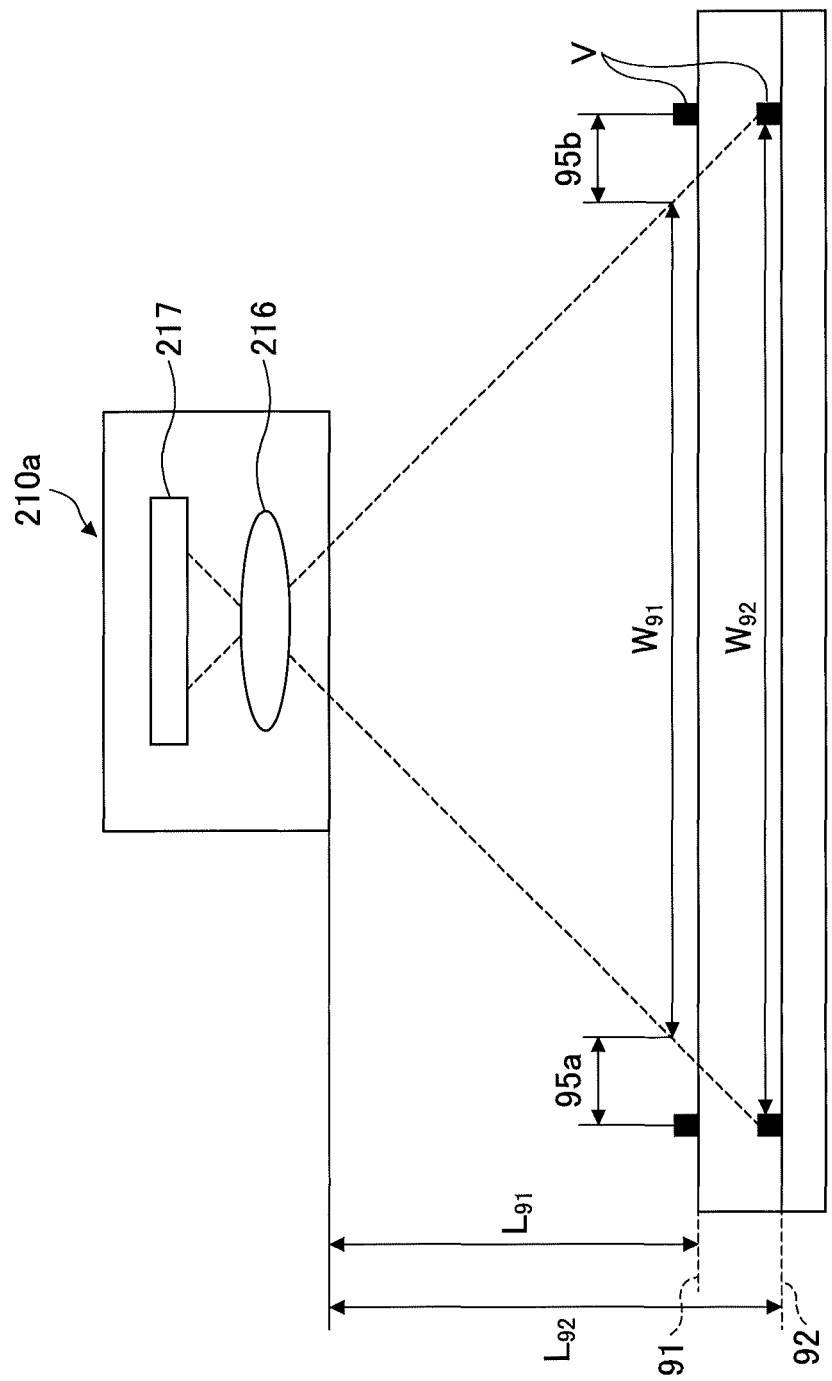
FIG. 9 is a diagram illustrating an example of a configuration of a reading device including an optical reduction system according to a second embodiment of the present invention.

FIG. 9 is a diagram illustrating an example of a configuration of the reading device 210a including an optical reduction system according to the second embodiment. As illustrated in FIG. 9, the reading device 210a includes an optical reduction system 216 and a CCD 217. The optical reduction system 216 is formed by combining optics, such as a plurality of lenses or mirrors, to reduce an image of a subject and focus the image on the imaging surface of the CCD 217. The CCD 217 can capture an image of a subject focused on the imaging surface.

In FIG. 9, a surface position 91 indicates the surface position of the recording medium P when the recording medium P is cardboard, and a surface position 92 indicates the surface position of the recording medium P when the recording medium P is a thin sheet. As illustrated in FIG. 9, a height $L_{91}$ from the surface position 91 to the reading device 210a and a height $L_{92}$ from the surface position 92 to the reading device 210a differ due to the difference in the thickness of the cardboard and the thin paper. Accordingly, a subject size $W_{91}$ at the surface position 91 and a subject size $W_{92}$ at the surface position 92 will be different, resulting in magnification errors 95a and 95b.

Due to the magnification errors 95a and 95b, there will be a deviation in the corresponding relationship between the edge position of the recording medium P and the edge position of the reference mark image V detected by the image inspection apparatus 200, and the position to be corrected by the image position correcting unit 112 of the image forming apparatus 100, and, therefore, the correction cannot be accurately performed.

Therefore, in the present embodiment, when the recording medium P is cardboard, the white color small diameter roller 222 or the black color small diameter roller 223 (hereinafter, referred to as the small diameter roller) is brought into contact with the other side of the recording medium P. Further, when the recording medium P is a thin sheet, the white color large diameter roller 224 or the black color large diameter roller 225 (hereinafter, referred to as the large diameter roller) is brought into contact with the other side of the recording medium P. Then, a diameter D1 of the small diameter roller and a diameter D2 of the large diameter roller are determined to satisfy the following equation:

$$(D2-D1)/2 = L_{92} - L_{91}$$

Accordingly, the difference between the height $L_{92}$ and the height $L_{91}$ is cancelled, so that a magnification error can be prevented.

Note that other effects are the same as those described in the first embodiment.

Further, depending on the brand (type) of the recording medium P, the color of the image transferred to and fixed on the recording medium P may not be appropriate.

In this case, the image forming apparatus included in the printing system may be provided with a white image forming unit that forms a white image on the recording medium P using white toner. Then, before the image forming unit 103 of another color forms an image, the white image forming unit forms (pre-coats) a solid white image on the surface of the recording medium P, and then a toner image of the other color is formed on the white image. Accordingly, the image transferred to and fixed on the recording medium P can be an appropriate color. Further, the printing system may include a mechanism unit for exchanging the arrangement of the white image forming unit and the image forming unit 103 so that the image formation by the white image forming unit can be performed before the image formation of the other colors.

According to one embodiment of the present invention, it is possible to appropriately detect the edge position of a recording medium or the edge position of an image formed on the recording medium, regardless of the type of recording medium.

The image inspection apparatus and the image forming apparatus are not limited to the specific embodiments described in the detailed description, and variations and modifications may be made without departing from the spirit and scope of the present invention.

What is claimed is:

1. An image inspection apparatus comprising:
    a processor configured to:
        output color information of an image to be formed on a recording medium, the color information being determined according to a type of the recording medium;
        output an image signal obtained by reading the recording medium;
        output at least one of an edge position of the recording medium and an edge position of the image formed on the recording medium that are detected based on the image signal input from the processor;
    a plurality of rollers with different diameters configured to face and contact another side of the recording medium and having different heights in a direction intersecting a surface of the recording medium;
    a plurality of rollers with different colors configured to face and contact the another side of the recording medium and having different colors; and
    a revolver configured to bring one member, which is selected according to the type of the recording medium from among the plurality of rollers with different diameters and the plurality of rollers with different colors, into contact with the another side of the recording medium.

2. The image inspection apparatus according to claim 1, wherein the processor is further configured to output information of a read target color of the recording medium or the image formed on the recording medium to be read by the processor, the read target color being determined according to the type of the recording medium.

3. The image inspection apparatus according to claim 2, wherein
    upon detecting that the processor is to output the edge position of the image formed on the recording medium,
    the processor outputs the color information of the image that is determined to be a color on a side of a complementary color to a color of the recording medium in a hue ring, and
    the processor outputs the information of the read target color that is determined to be a color on a side of a similar color to the color information of the image in the hue ring.

4. The image inspection apparatus according to claim 2, wherein upon detecting that the processor is to output the edge position of the recording medium,
    the revolver brings one member among the plurality of rollers with different colors of a color having high contrast to a color of the recording medium, into contact with the another side of the recording medium, and
    the processor outputs the information of the read target color that is determined to be a color on a side of a complementary color to or a color on a side of a similar color to the color of the recording medium in a hue ring.

5. The image inspection apparatus according to claim 4, wherein
    the revolver brings one member among the plurality of rollers with different colors of a color having low brightness into contact with the another side of the recording medium upon detecting that the color of the recording medium has high brightness, and
    the revolver brings one member among the plurality of rollers with different colors of a color having high brightness into contact with the another side of the recording medium upon detecting that the color of the recording medium has low brightness.

6. An image forming system comprising:
    the image inspection apparatus according to claim 1, and
    an image forming apparatus including:
        a photoconductor drum configured to form a reference mark image on a recording medium, according to color information of an image to be formed on the recording medium input from an image inspection apparatus;
    wherein the processor is further configured to correct an edge position of the image to be formed on the recording medium, based on at least one of an edge position of the recording medium and an edge position of the reference mark image formed on the recording medium that are detected by the image inspection apparatus.

7. The image inspection apparatus according to claim 1, wherein the revolver is configured to bring one member, which is selected according to a thickness of the recording medium from among the plurality of rollers with different diameters, into contact with the another side of the recording medium.

8. The image inspection apparatus according to claim 1, wherein
    the plurality of rollers with different diameters include a plurality of cylindrical members with different diameters.

9. The image inspection apparatus according to claim 1, wherein
    the plurality of rollers with different diameters and the plurality of rollers with different colors respectively include a plurality of cylindrical members,
    the revolver includes a columnar member, and
    the revolver is configured to
        rotate the plurality of cylindrical members, which are arranged around a columnar axis of the columnar member, about the columnar axis of the columnar member, and
        bring one member of the plurality of cylindrical members into contact with the another side of the recording member.

10. The image inspection apparatus according to claim 1, wherein the processor is further configured to acquire brand information of the recording medium.

* * * * *